Aug. 22, 1933.     H. F. WILLIS, JR     1,923,347
ELECTRIC METER
Filed Oct. 17, 1931
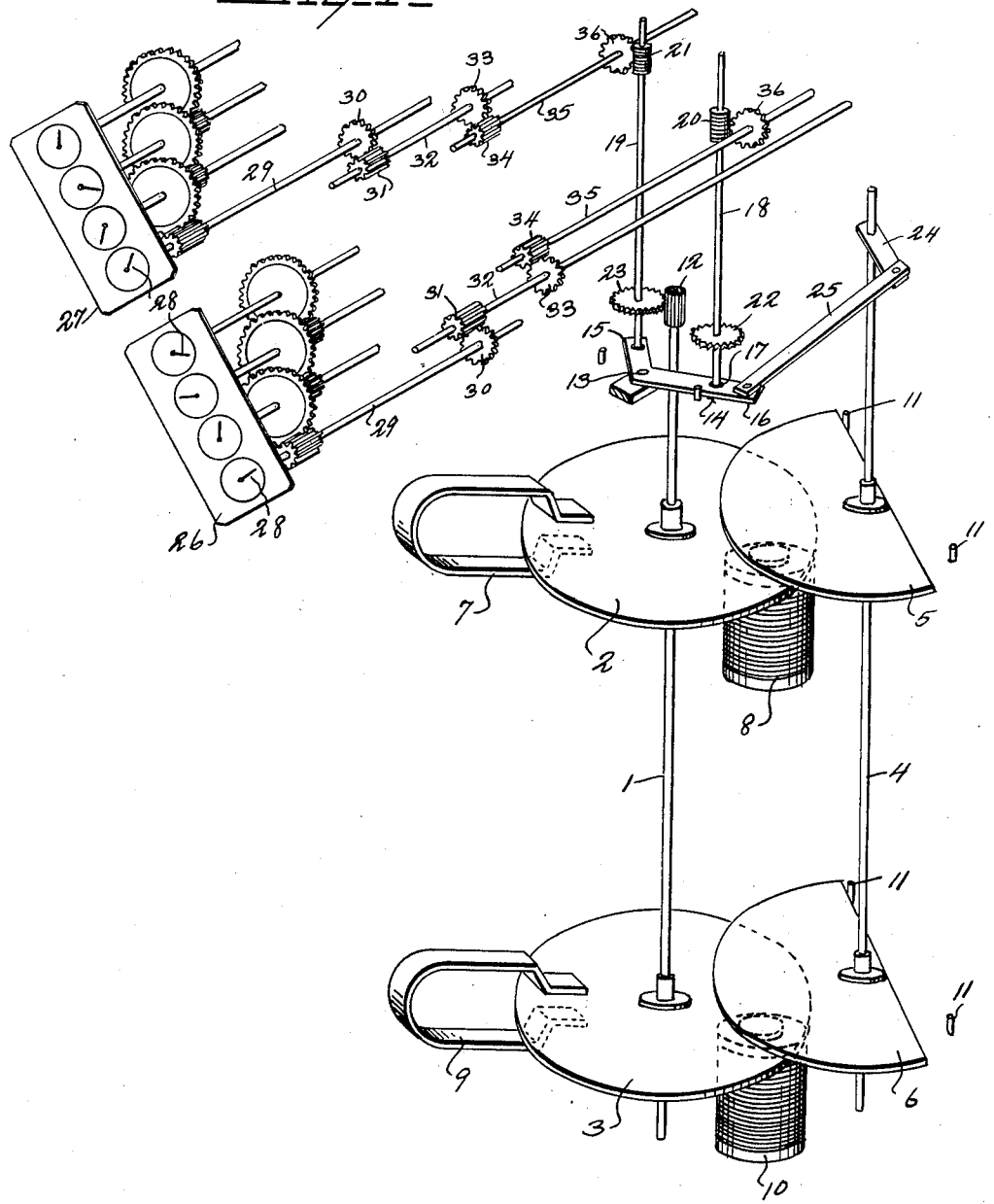
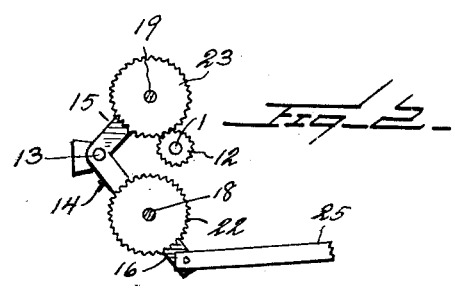
Inventor
H. F. Willis, Jr
By Watson E. Coleman
Attorney Patented Aug. 22, 1933

1,923,347

UNITED STATES PATENT OFFICE 1,923,347

ELECTRIC METER

Henry F. Willis, Jr., Carbondale, Ill.

Application October 17, 1931. Serial No. 569,522

6 Claims. (Cl. 171—268)

This invention relates to electrical measuring instruments and pertains particularly to an electric meter.

The primary object of the present invention is to provide a mechanism which is designed to be used for registering the amount of current flowing in two directions in a current carrying line, the device being designed primarily for registering the amount of energy passing in either direction through tie lines between generating units or plants or lines supplying the power to regenerative equipment, or on locomotive where current flows in one direction while the motors are pulling and is generated to flow in the opposite direction by the reversal of the motors when the engine is allowed to coast down a grade, and in any other capacities where it is desirable that a record be maintained of current passing in either direction through a line.

A further object of the invention is to provide an electric meter having two sets of gear trains, one for measuring incoming and the other for measuring outgoing current, in which the shifting of certain parts of the mechanism in accordance with the direction of flow of the current is accomplished through the medium of plates or disks controlled in the same manner as the usual driven and drag disks of a meter of ordinary type.

A further object of the invention is to provide a mechanism of the above described character which is designed to accurately record the quantity of current flowing through a line in which the meter is connected, no matter how rapidly the direction of flow of the current changes.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes and modifications mark no material departure from the salient features of the invention as expressed in the appended claims.

In the drawing:—

Figure 1 is a diagrammatic perspective view of the structure embodying the present invention;

Figure 2 is a detailed plan view of the oscillating member showing the relation of the gears supported thereby with the operating shaft carried pinion.

Referring now more particularly to the drawing wherein like numerals of reference indicate corresponding parts throughout the several views, the numeral 1 indicates the disk shaft which is common to electric meters and upon which are mounted the upper and lower disks 2 and 3 which are of aluminum metal. In the usual watt-hour meter the lower disk is positioned between the poles of a pair of electro-magnets and a steel plate or disk, these magnets and disk together with the lower plate constituting the driving mechanism for the shaft 1 the magnets being connected with the circuit in which the meter is mounted, to receive power therefrom. In such meters the upper disk rotates between the poles of a pair of permanent magnets which operate to create a drag thereon and thus control the rotation of the shaft and the operation of the meter.

In the present meter structure there is mounted in suitable bearings, a second shaft which is indicated by the numeral 4 and which is parallel with the disk shaft 1 as shown and this shaft has mounted thereon the upper and lower semi-circular disks 5 and 6 respectively, which overlie the disks 2 and 3 as illustrated.

Instead of having the upper disk controlled entirely by permanent magnets and lower disks under the influence of electro-magnets, the present meter has a permanent magnet 7 disposed at the opposite side thereof from the disk 5, and an electro-magnet 8 disposed therebeneath upon the side adjacent the disk 5 and consequently beneath this disk also, and the lower disk 3 likewise has a permanent magnet which is indicated by the numeral 9, which is arranged to have the portion of the disk remote from the disk 6 between its poles and an electro-magnet 10 which is disposed therebeneath and beneath the semi-circular disk lying thereabove. These electro-magnets 8 and 10 are wired to receive current from the line in which the meter is placed, in the usual manner.

Mounted in any suitable manner, adjacent the straight edge of each of the semi-circular disks 5 and 6, are stop pins 11 which limit the turning of the disks 5 and 6 and the shaft 4 upon which they are mounted. These disks will be hereinafter referred to as the control disks as it is through their oscillation in one direction or the other, in accordance with the direction of flow through the currents of the electro-magnets 8 and 10, that the recording mechanisms of the meter are thrown into or out of operation.

Upon the upper end of the shaft 1, which may be referred to as the operating shaft as it is through the continued rotation of this shaft that the metering mechanism works, there is mounted a gear pinion 12. Mounted upon a suitable pivot 13 located adjacent the upper end of the operating shaft 1 is an angled bar 14 which has two portions 15 and 16, and the pivot 13 connects with and supports this bar at the point where these two portions join. Each of the portions of the bar 14 carries a bearing of a suitable character, adjacent its free end as indicated at 17 and in these bearings are mounted vertical shafts 18 and 19 which carry upon their upper ends the worms 20 and 21. These shafts 18 and 19 also carry gears 22 and 23 which are arranged at a suitable height thereon to mesh with the pinion 12. As will be seen the bar 14 is so designed that only one of these gears 22—23 may mesh with the gear pinion 12 at a time and the changing from one gear to the other as is necessary is accomplished through the oscillation of the bar 14 in the proper direction and in the manner about to be described. The teeth of the pinion 12 and the gears 22 and 23 are preferably very fine and sharply pointed to make meshing of one with the other easy.

The oscillation of the bar 14 for the selective meshing of the gears 22—23 with the pinion 12, is controlled by the control shaft 4 which at its upper end carries an arm 24, the outer end of which is connected with the bar 14 by the link 25.

The meter may be provided with gear trains of any suitable character and having any number of dials. In the present case the two gear trains shown and indicated by the numerals 26 and 27 are each shown as having four dials each of which has the usual indicator 28 which is connected with an actuating shaft 29. The usual gear and pinion connections between the shafts 29 are shown, by which the dial containers or indicators 28 are turned at the proper speed ratio. The first dial shaft 29 of each gear train carries a gear 30 which meshes with a pinion 31 mounted upon an adjacent shaft 32 and this shaft 32 also carries a gear 33 which meshes with a gear pinion 34 mounted upon a shaft 35. The shaft 35 carries a gear 36 which is permanently in mesh with the worm 20 or 21 which is adjacent thereto.

One of the gear trains, as for example, the train indicated generally by the numeral 27 may be employed for registering the current flowing in one direction through the meter, as for example, the incoming current, while the train 26 registers the current flowing in the opposite direction, or the outgoing current.

In operation, the disks 2 and 3 will be rotated in accordance with the direct flow of current through the magnets 8 and 10. Should these disks be rotating in a clockwise direction the control disks 5 and 6 will be so positioned as to maintain the bar 14 in a position where the gear 23 will be in mesh in the pinion 12 and thus the incoming current registering mechanism 27 will be in operation.

Upon reversal of the current flow the disks 2 and 3 will change their direction of rotation and the disks 5 and 6 will oscillate in a counter-clockwise direction and thus swing the bar 14 so as to disengage the gear 23 from the pinion 12 and engage the gear 22 through, thus stopping the gear train 27 and starting the operation of the train 26.

From the foregoing it will be readily apparent that a meter constructed in accordance with the present invention may be employed in locations where two meters are at present necessary and thus effect a decided economy in the construction and operation of lines where the current flow may be in either direction and it is desirable that the registration be made of the amount flowing in either direction.

It will, of course, be understood that it is essential that the various moving elements be delicately balanced particularly the oscillating bar 14 and in this connection any suitable means may be employed for bringing about or obtaining a balanced condition of this bar at the pivoting point 13 so that the same will oscillate or swing easily and smoothly under the influence of the links 25 and the members connected therewith.

Having thus described the invention, what is claimed is:—

1. An electric meter for measuring current flow, comprising a rotary disk carrying shaft, electro-magnetic means for rotating said disk and shaft, a current registering gear train, shiftable means for operatively coupling said shaft with said train, and an armature having limited oscillatory movement, controlled and actuated by said electro-magnetic means according to the direction of current flow therethrough and connected with said shiftable means to actuate the same.

2. An electric meter for measuring current flow in two directions, comprising a rotary element, current consuming means maintaining constant rotation of said element during the flow of current therethrough in either direction, a pair of current registering mechanisms, mechanism for selectively coupling the registering mechanisms with said element, and an oscillatably mounted armature actuated by the current flowing through said first means for operating said selective coupling mechanism.

3. An electric meter for measuring current flow in two directions, comprising a shaft, a disk carried by said shaft, a second shaft, a disk carried by the second shaft, a pair of current flow registering mechanisms, means for selectively coupling said mechanisms with said first shaft for the operation of one mechanism thereby, and electro-magnetic means controlling said disks, said electro-magnetic means operating to rotate said disks according to the direction of current flow therethrough, and said second mentioned shaft being connected with said selective coupling means for the control of the same.

4. An electric meter for measuring current flow in two directions, comprising a pair of current registering mechanisms, a disk carrying shaft, electro-magnetic means for rotating said disk and shaft in accordance with the direction of current flow therethrough, a gear element carried by said shaft, a pair of shiftably mounted gear elements each designed to have connection with said shaft gear and each having permanent gear connection with a registering mechanism, and means for moving said shiftably mounted gear elements for the coupling of one thereof with said shaft gear in accordance with the direction of current flow through the electro-magnetic means, consisting of an oscillatable support for said gear means, an oscillatable shaft, connecting means between the shaft and the support, and a disk carried by the shaft and actuated by said electro-magnetic means, said disk and shaft having a limited oscillatory movement.

5. An electric meter for measuring current flow in two directions, comprising a pair of current registering mechanisms, a disk carrying shaft, electrically actuated means for rotating said shaft and disk, a gear element carried by the shaft, a pair of shafts each having gear connection with a registering mechanism and each carrying a gear element designed to couple with the gear of said shaft, oscillatable supporting means for said pair of shafts whereby the gear element of a selected one may be brought into engagement with said first gear, a second shaft, an armature disk carried thereby and having limited oscillatory movement, and an arm carried by said last shaft coupled with said oscillatory member for actuating the same, said second disk being disposed in the field of the electric means controlling the first disk, for actuation thereby in accordance with the direction of current flow therethrough.

6. An electric meter for measuring current flow in two directions, comprising a pair of metering gear trains, rotating means maintaining constant rotation during the passage of current in either direction through the meter, means for selectively coupling said rotating means with said metering gear trains, and means operated solely by the current flow through the meter to selectively couple said first means with the gear trains in accordance with the direction of current flow.

HENRY F. WILLIS, Jr.